INVENTOR.
PAUL REKETTYE
BY
ATTORNEYS

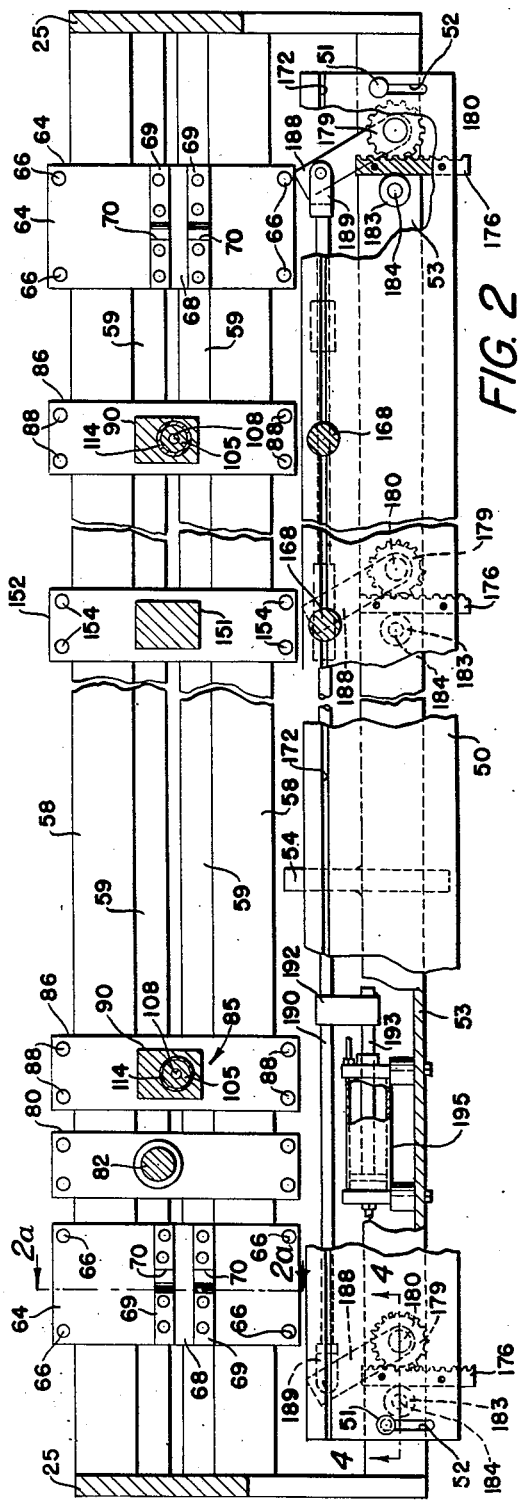
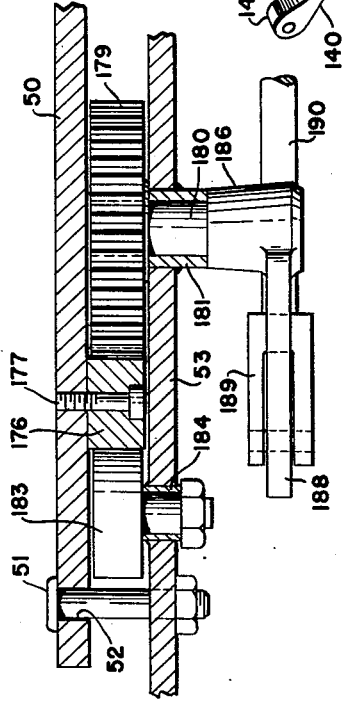
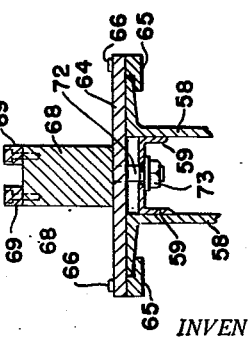
FIG. 2
FIG. 6a
FIG. 4
FIG. 2a
INVENTOR.
PAUL REKETTYE
BY
ATTORNEYS

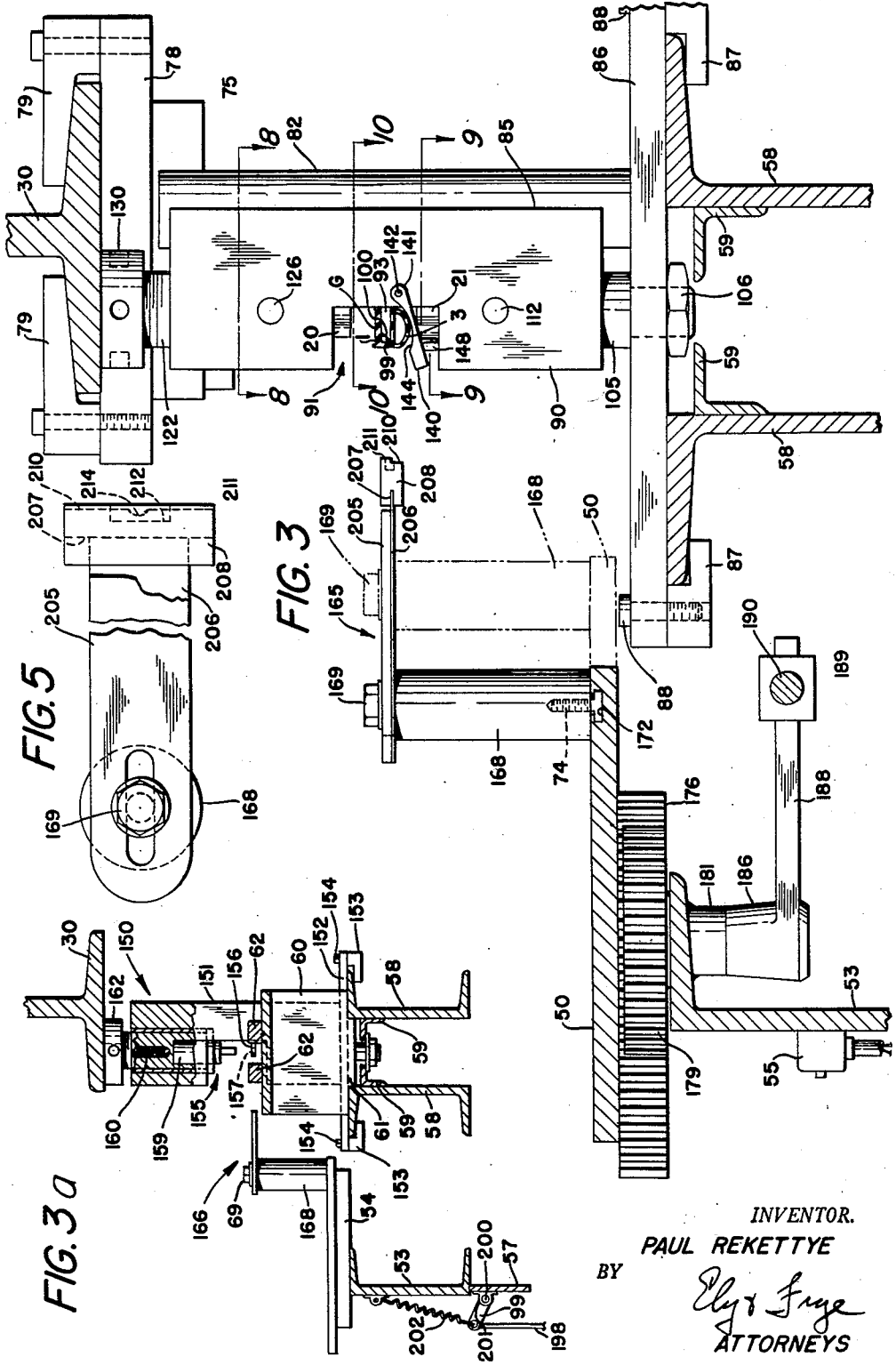

June 25, 1957  P. REKETTYE  2,796,929
APPARATUS FOR CUTTING SEALING GASKETS
Filed July 3, 1951  6 Sheets-Sheet 4
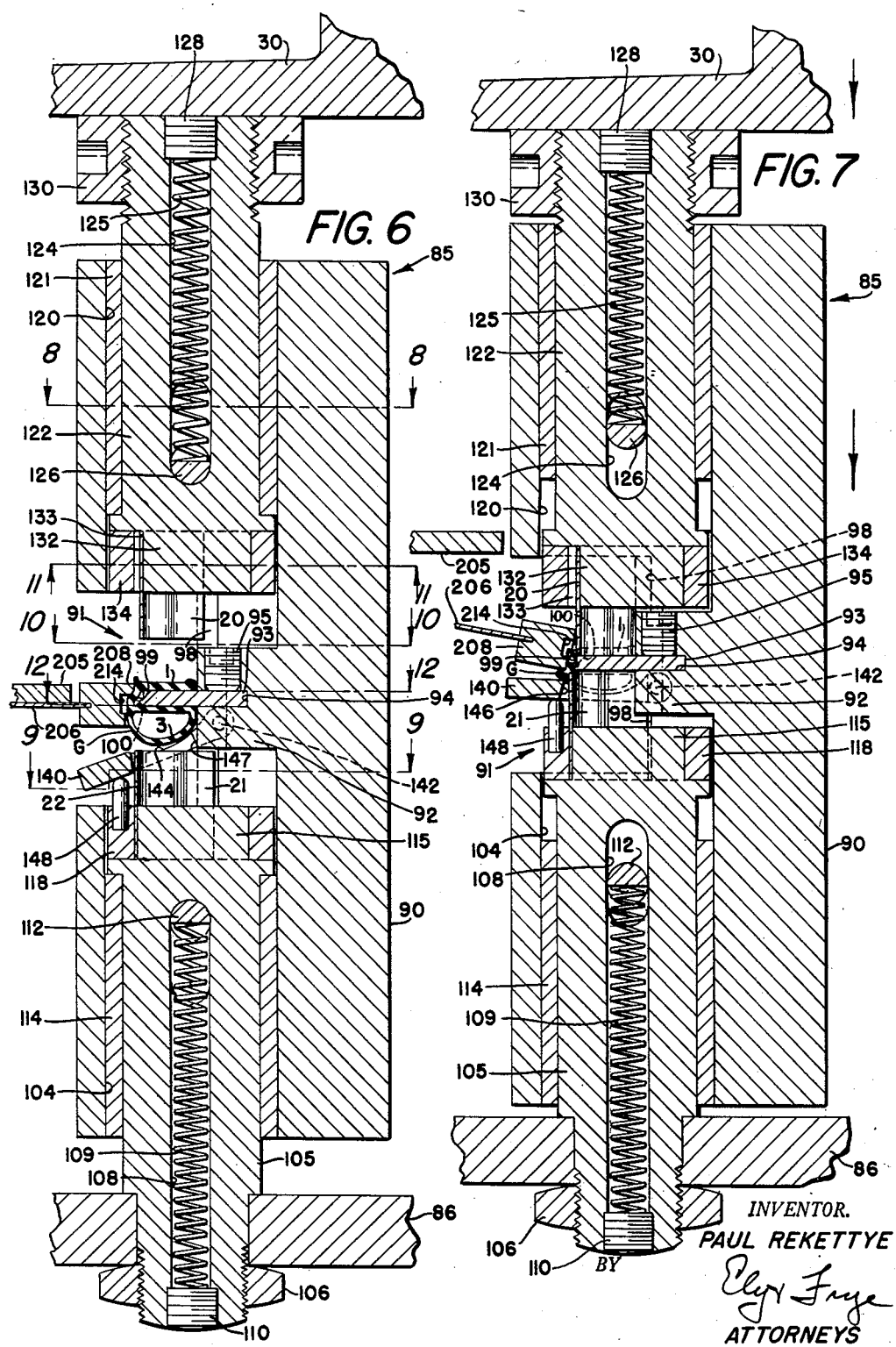
INVENTOR.
PAUL REKETTYE
BY
ATTORNEYS June 25, 1957 P. REKETTYE 2,796,929
APPARATUS FOR CUTTING SEALING GASKETS
Filed July 3, 1951 6 Sheets-Sheet 5

INVENTOR.
PAUL REKETTYE
BY
*Ely T Frye*
ATTORNEYS

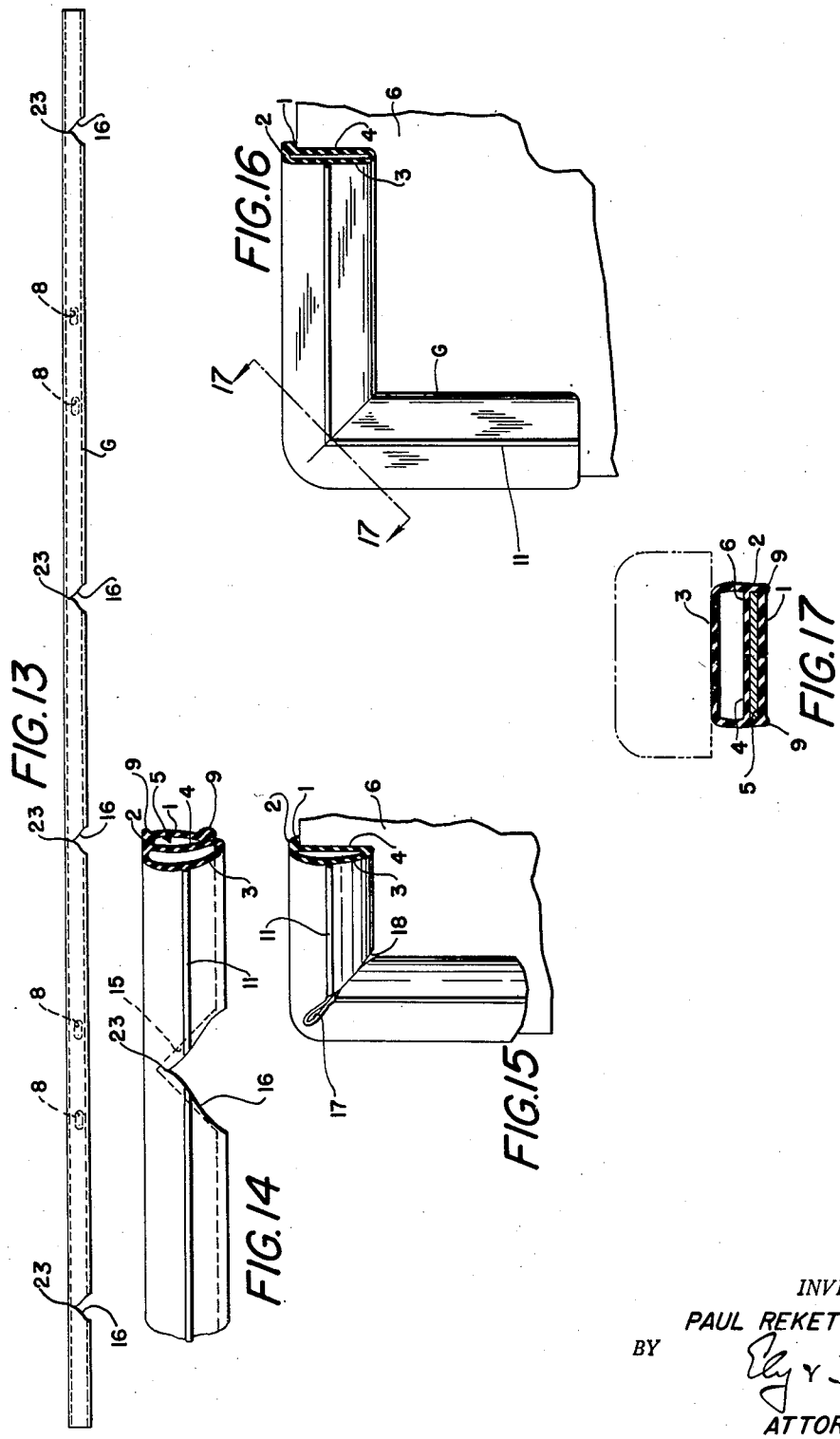

2,796,929
APPARATUS FOR CUTTING SEALING GASKETS

Paul Rekettye, Akron, Ohio, assignor to The Sun Rubber Company, Barberton, Ohio, a corporation of Ohio Application July 3, 1951, Serial No. 235,041

9 Claims. (Cl. 164—50)

The present invention relates to a step in the manufacture of sealing gaskets of the type used around the doors of refrigerators or similar receptacles, where it is desired to hermetically seal the contacting surfaces of a door and its frame. The invention solves a problem which confronted the manufacturers of refrigerators in cutting the gasket so that it would make an air tight seal at the corners of the door. The invention deals with a particular type of gasket, as will be seen from the detailed description, but the invention is not confined to that type of gasket and the principles of the invention may be adapted and modified for other types of gaskets as well.

Gaskets for the stated purpose are formed in long strips, usually of a high grade rubber composition, which are extruded in the desired cross section and then vulcanized. Thereafter the strips are cut to the correct lengths and, at the points where the gasket passes around the corners of the frame, V-shaped notches are cut in the strip so that it can be bent to the required angle to fit the door. At the same time, slots are cut in one side of the gasket to permit access to the screws by which the gasket is attached to the plate on the inside of the door.

The particular gasket for which this invention has been especially developed is illustrated herein and will be described in full in the following specification, it being sufficient here to say that the cross section of the strip bears some resemblance to the small letter e in reverse. It has a horizontal web which is connected by a short vertical web with a hollow half oval section, the under flat side of which in repose converges toward the horizontal web. The space between these parts of the gasket forms a channel, open on one side, which receives the edge of the plate to which the gasket is secured. The top portion of the gasket is hollow and arched and is made of somewhat lighter gage rubber stock, and hence is more flexible than the lower part of the gasket. When the door is closed, this hollow portion of the gasket is compressed and flattened by the closing of the door, making the air tight seal about the door opening.

This and similar types of gaskets have been developed by the refrigerator manufacturers. The difficulty which has been experienced is in the cutting of the notches at the points where the gasket goes around the corners of the door in such a manner that when the gasket is in position and the door closed there will be air tight seals at the several corners. There is no especial problem connected with the cutting of V-shaped notches in the horizontal lower web of the gasket, which will accurately match and make a tight seal at the corners. The difficulty has arisen in cutting the V-shaped notches in the hollow, compressible top portion of the gasket. This is due to the compressibility and yieldability of the upper portion of the gasket.

It has heretofore been impossible to cut the upper portion of the gasket by machine tools and have the resulting notches so formed that when the gasket is mounted in place and the door closed the notches in the gasket at the corners of the door will be completely sealed. Attempts at die-cutting these notches have required that the cut be trimmed by hand shears in order to approximate a tight seal at the corners when the door is closed.

What the present inventor has achieved is a process and apparatus by the use of which V-shaped notches will be cut in the upper and lower sides of the gasket simultaneously, and the V-shaped notches in the upper or compressible side of the gasket will be so formed that when the door is closed the corners will be tightly sealed, without the necessity of making any additional trimming operations. This result has been achieved by a number of factors, as will be explained in detail herein, it being sufficient to state here that the machine and process take into account and compensate for the deformation of the upper side of the gasket at the time of cutting and also at the time the door is closed. This is done by preliminarily deforming the flexible yielding top portion of the gasket just before the cutting operation and by designing the die or knife which forms the V-shaped cut so that the walls or edges of the notch will, when the door is closed, meet along the entire line of the cut with sufficient and uniform pressure to achieve an air tight seal. It is impossible to completely flatten the top side of the gasket for the cutting operation and the two factors, i. e., the preliminary deformation of the gasket and the outline of the die are coordinated and correlated so that the results are accomplished.

Not only are the process and apparatus both new and inventive, but the finished product is original and patentable.

The machine which is shown and described herein is a gang cutter or die, which cuts all of the V-shaped notches at one time, and at the same time cuts the gasket to correct length and punches the slots in the horizontal web through which the holding screws pass. It will be appreciated that these additional operations are for economical production. It will also be appreciated that the invention, in some of its aspects, may be practiced by the cutting of the V-notches singly and is not limited to multiple operations, and that the angle included between the sides of a notch should be such that the edges of the notches meet in the manner stated.

It will also be appreciated that the invention is shown as applied to an individual type of gasket and may be applied to gaskets of other configurations where the problem is present of cutting notches which will seal at the corners of the gasket when the closure is made. Nor is the invention limited to the use of the gasket on refrigerator doors, as other types of containers may beneficially employ the invention.

In the drawings, in which the best known and preferred type of apparatus is shown:

Fig. 2 is a horizontal section on the line 2—2 of Fig. 1, looking down on the table at the front of the machine.

Fig. 2a is a section on the line 2a—2a of Fig. 2.

Fig. 3 is a vertical section on the line 3—3 of Fig. 1 showing in full lines one of the pressure feet which holds the gasket against the mandrel in its outer or withdrawn position.

Fig. 3a is a section on the line 3a—3a of Fig. 1.

Fig. 4 is a section on the line 4—4 of Fig. 2 showing the mechanism for moving the table which carries the pressure feet toward and from the cutters.

Fig. 5 is a detailed view of one of the pressure feet used at the notching points.

Fig. 6 is a vertical section through one of the knife blocks for cutting the V-shaped notches in the upper and lower portions of the gasket. In this view the dies or knives are located at the outer limits of their strokes. This view is taken on the line 6—6 of Fig. 10.

Fig. 6a is a detailed view of one of the compression plates which flattens the flexible portion of the gasket for the cutting of the V-shaped notches therein.

Fig. 7 is a view similar to Fig. 6 but showing the dies at the inner limits of their strokes.

Figure 1:
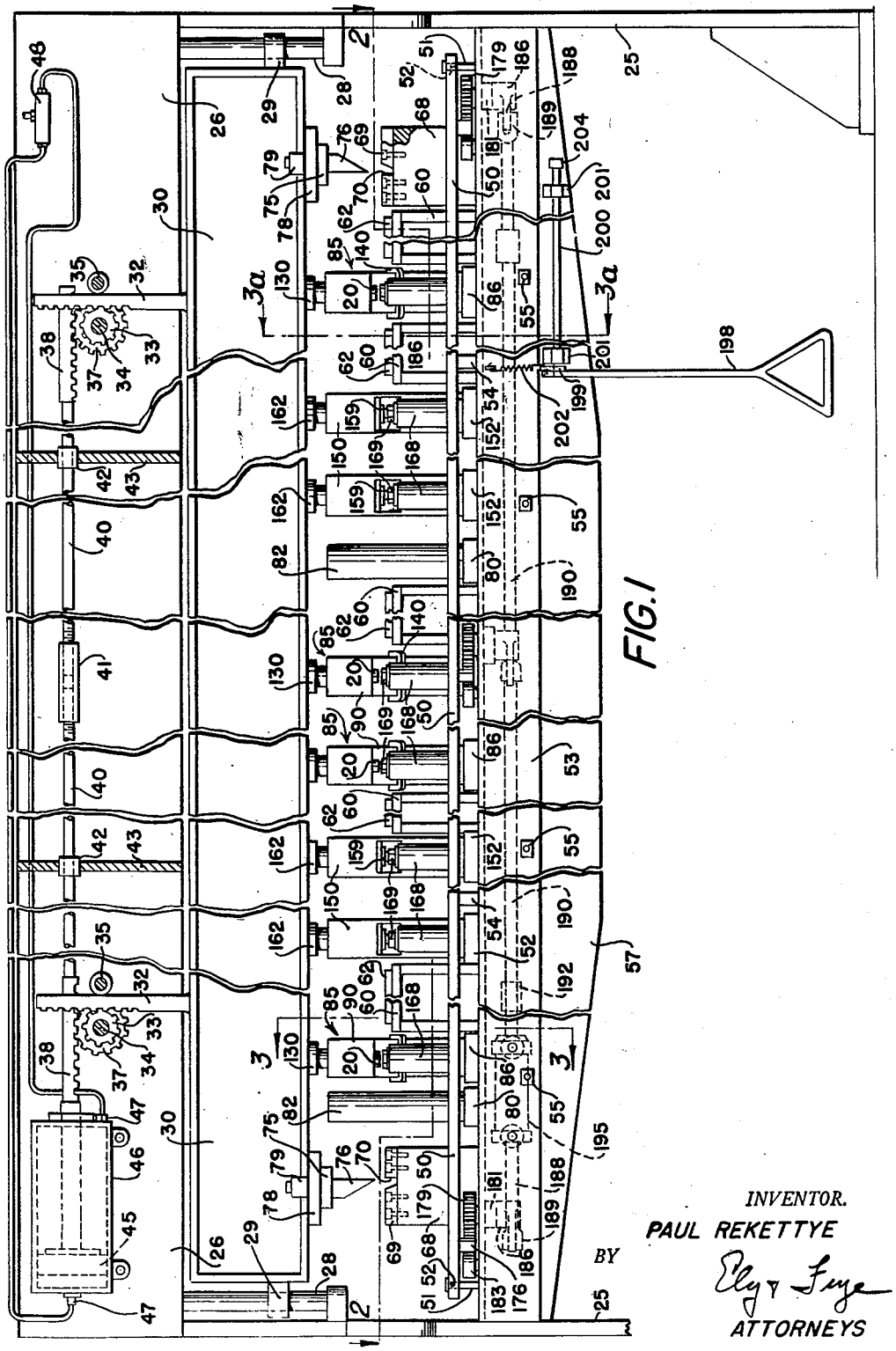
Fig. 1 is a front elevation of a complete machine in which all of the cutting, notching and punching operations are performed at one stroke of the cutter head. As a strip of the gasket for a single refrigerator door is quite long, the head and the lower part of the machine are shown as broken out at several points.
Figure 8:
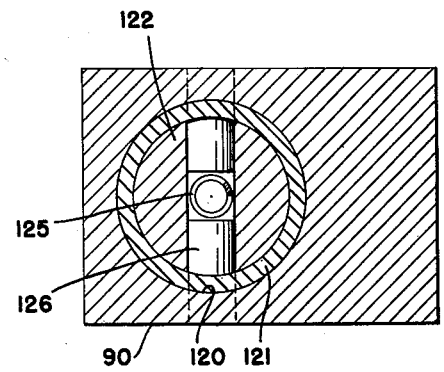

Fig. 8 is a section on the lines 8—8 of Figs. 3 and 6.

Figure 9:
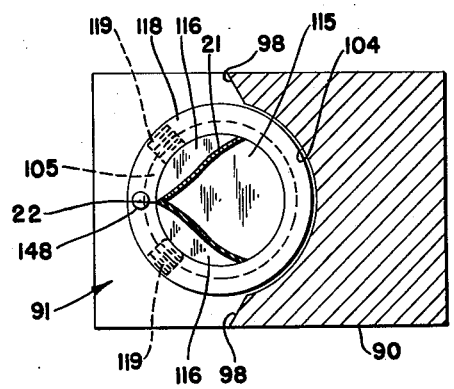

Fig. 9 is a section on the lines 9—9 of Figs. 3 and 6.

Figure 10:
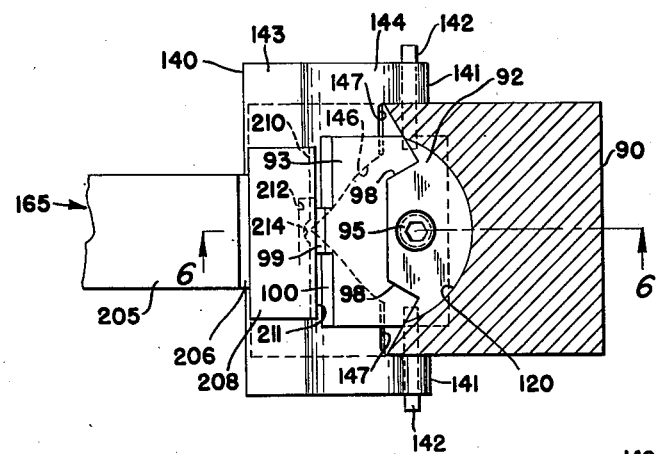

Fig. 10 is a section on the lines 10—10 of Figs. 3 and 6.

Figure 11:
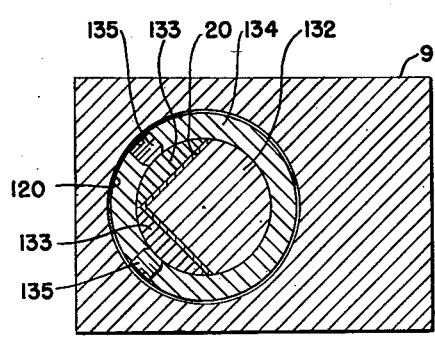

Fig. 11 is a section on the lines 11—11 of Fig. 6.

Figure 12:
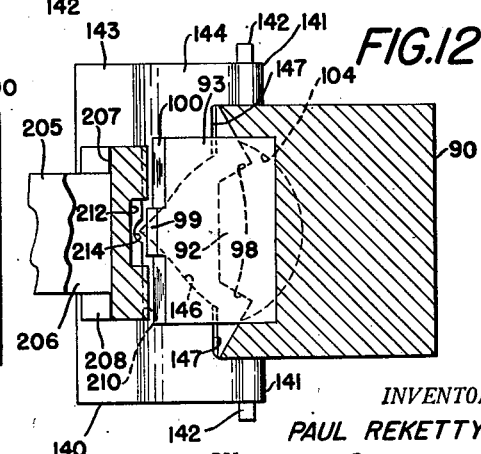

Fig. 12 is a section on the lines 12—12 of Fig. 6.

Fig. 13 is a view showing a complete gasket after it has been cut by the machine.

Fig. 14 is an enlarged view looking at the top of the finished gasket at one of the V-shaped notches.

Fig. 15 is a view looking at one of the corners of the door plate with the gasket in position, this view being taken with the door open.

Fig. 16 is a view showing the position which the corner of the gasket assumes when the door is closed.

Fig. 17 is a view across the corner of Fig. 16, the location of the view being shown by the line 17—17 of Fig. 16.

It will be noted that in the preliminary description of the gasket the soft, hollow, yielding portion thereof is referred to as the top of the gasket because this portion is exposed when the refrigerator door is open, but that in placing the gasket in the machine the gasket is reversed so that the top portion of the gasket lies beneath the mandrel to be described.

The gasket

The gasket G is supplied to the refrigerator manufacturer in the long length shown in Fig. 13. It comprises a lower, horizontal, comparatively heavy web 1 connected to a short vertical wall 2 and to the hollow arched top portion 3. The inner wall 4 of the portion 3 and the web 1 form a channel 5 which is received over the edge of a plate 6 forming part of the door. The web 1 and the wall 4 converge so that the yielding rubber tends to grip the edge portion of the plate. At points along the plate are screws, not shown, which hold the plate in place on the door and passages for these screws are provided by slots 8 punched at intervals in the web 1. Beads 9 are provided along the edges of the web 1. The upper portion 3 of the gasket is arched and yielding, as has been described, and along the crown is the bead 11.

The straight-walled V-shaped notches formed in the web 1 are indicated at 15 and, as noted above, these notches are cut with the straight side edges at an angle of 45° to the edge of the strip, if the gasket is to be bent at 90° in going around the corners of the door.

The notches cut in the upper or yielding portion of the gasket are given the numeral 16. They register along the gasket with the notches 15 and are cut with an included angle conformable with the angle of the notches 15. It will be noted that the notches 16 are cut in both the upper and lower sides of the portion 3 of the gasket.

As shown, particularly in Fig. 14, the walls or edges of each notch 16 are not straight, but are cut so that when the gasket is in repose, as in Fig. 14, the edges appear as an ogee curve, which however is slightly exaggerated in Fig. 14. The reasons for adopting this configuration for the walls of the notch 16 are, first, to compensate for the deformation of the hollow portion of the gasket during the cutting operation and, second, to secure an air tight, edge-to-edge contact of the walls of the notch when the yielding hollow portion 3 of the gasket is flattened out by the closing of the refrigerator door. As shown in Fig. 15, when the door is open and pressure on the top of the gasket is relieved, there will be a small oval-shaped opening 17 at the vertex of the notch and a slight spread 18 at the inside corner. When, however, the door is closed and the gasket flattened, the walls or edges of the notches will be in complete line-to-line contact across the corners of the gasket, as shown in Figs. 16 and 17.

The configuration and curvature given to the edges of the notches 16 are important features of this invention and are carefully calculated so that the cutting operation on the partially compressed gasket will give the desired result.

The knife or die for cutting the notch 15 is shown in cross section in Fig. 11 and bears the numeral 20. The arms of this die are straight, as shown, for there is no deformation of the wall 1 either during the cutting operation or when the gasket is in use. The configuration of the die 21 for cutting the notches 16 in the upper and lower sides of the part 3 of the gasket is shown in Fig. 9. It will be seen that the ogee-curvature of this die is not in exact conformity with the showing of the notch 16 in Fig. 14, and also that the distance from the point or tip 22 of the die to the ends of the side walls is somewhat longer than the distance from the tip 23 of the notch 16 to the extremities thereof. This is due to the fact that the gasket is partially flattened during the notching operation. It will also be observed that the tip 23 of the notch 16 is not in exact register with the tip of the notch 15 when the gasket is in repose, as seen in Fig. 14. This is because the gasket is flattened when the door is closed, which displaces the tip of the notch 16 outwardly to a slight extent.

All of the above details of the configuration of the notch 16 make possible accurate cutting of the corner notches of the gasket so that the air tight corner seal is made when the refrigerator door is closed.

The machine frame and operating mechanism

The machine for cutting the gaskets to the finished condition shown in Fig. 13 is of considerable length so that it will take a single length of gasket and the operation of the machine usually requires the services of two operators, who place the long length of uncut rubber gasket in position. The machine is adjustable in all of its operating parts so that different lengths of gaskets may be cut and so that the number and locations of the notches and slots may be varied.

The machine is supported on two vertical uprights 25 across the top of which is the long housing 26 in which the head operating mechanism is located. At the ends of the machine are located the two vertical posts 28 over which move the guiding collars 29 attached to the vertically moving cross head 30. The cross head is a long I-beam which is supported and moved by two vertical arms 32 which extend into the housing where they are provided with racks which are in mesh with pinions 33 on transverse shafts 34. Rollers 35 hold the racks in engagement with the pinions.

On the shafts 34 are larger gears 37, each of which meshes with a rack section 38 which forms a part of a horizontal rod 40, preferably formed in two sections connected by a turn buckle 41 so that the rack sections may be shifted relatively to one another to bring both head operating gears in correct relation to assure parallel movement of the head. Sleeves 42 supported by cross-plates 43 guide the rod 40 in its movement to and fro in the housing. At one end, the rod 40 is connected to a piston 45, movable in an air cylinder 46 located in the housing and having the pressure inlets 47. Air is admitted to the ends of cylinder 46 by a solenoid-operated, two-way valve 44, which is normally in position to admit air to the right hand side of the cylinder to keep the head in raised position.

At the front of the machine is the long sliding table 50 which supports the pressure feet and which is guided in its movement toward and from the cutting units by headed pins 51, the upper ends of which are received in slots 52 cut in the ends of the table. Extending across the machine, beneath the table 50, is an angle iron beam 53 in which the pins are mounted. At spaced intervals along the top of the beam are short rails 54 which support the table in its movement. Mounted in the face of the beam 53 are four push buttons 55 which jointly control the valve 48. The four switches are in series so that both operators shall have both hands on the switches and out of the paths of the cutter when the cross head descends. By pressing on all of the buttons the valve 48 is moved to admit air to the left hand end of the cylinder 46, and the head descends. As soon as the cutting stroke is completed, the buttons are released and the valve 48 is returned to normal position, which returns the cross head to raised position.

Extending across the machine, beneath the cutters, are two parallel flanged beams 58, on the inner side and near the top of which are located, at intervals, spaced sections of angle irons 59. Beneath the beams 58 is located the truss beam 57.

Across the tops of the beams 58 are located the several spaced plates which support the several cutting and punching instrumentalities, the plates being adjustable along the beams so that the location of the cutting points may be varied. These will be described in connection with the instrumentalities mounted thereon.

Located on the beams 58 and held in position between the tops of the beams by downwardly extending tongues 61 are several wooden frames 60, which are placed between the cutting and punching devices to support the intermediate portions of the gasket. The upper surfaces of the frames have spaced rails 62 which form channels for the gasket.

At the two ends of the machine and located on the beams 58 are two cross plates 64 which are held in their adjusted positions on the beams by clamping plates 65 which engage the underside of the flanges of beams 58 and are drawn into clamping relation by bolts 66. On each plate is mounted an anvil 68, to the upper surface of which are attached the two gasket-positioning rails 69, said rails having alined notches 70, one side of each notch being vertical to form one of the cutting surfaces by which the gasket is cut to proper length.

Extending from the base of each anvil 68 and through the plate 64 is a pin 72 which projects between the angle irons 58 and is fitted with a nut and washer 73 by which the anvil unit is held at its fixed position along the beams 58. The mounting of the anvils permits them to be adjusted to vary the length of the finished gasket.

Above each anvil is a knife block 75 which carries a depending knife 76 to cut off the end of the gasket in conjunction with the notch 70. Knife block 75 is carried on a plate 78 which is clamped to the under side of the cross head 30 by clamping plates 79 engaging the lower flanges of the cross head and adjustable along the cross head to register with the notch 70.

At spaced points across the machine are located, on the beams 58, cross plates 80 from which rise posts 82 which are in the path of the cross head and arrest the downward movement of the cross head at the proper point when the cutters have completed their cutting strokes.

The notch cutting mechanism

As there are four sets of notches cut in the gasket, there are four notch-cutting units located in the machine. These units are the same and are given the general numeral 85. Each of these units is secured at its correct position along the beams 58 in a slightly different manner than the mounting of the anvils. Each is carried on a cross plate 86 clamped to the flanges of the beams 58 by clamping plates 87 drawn into gripping relation with the beams by the bolts 88.

The body of a V-notching instrumentality is a block 90 which is square in cross section, being provided on its front face with a relatively deep square recess, indicated at 91 on Fig. 3, at which point the gasket is inserted in the machine and at which point the dies operate upon the gasket. Located at approximately the vertical center of this recess is a ledge 92 which forms a support for a plate 93, the inner edge of which is received in a groove 94 cut in the face of the ledge and held by a set screw 95 threaded in the top of the ledge 92. This plate forms the mandrel against which the dies 20 and 21 meet to cut out the notches. At either side of the vertical center line of the block the metal thereof is cut away to form notches 98 shown in Fig. 10, so as to clear the dies above and below the mandrel 93.

In the operation of the machine, those portions of the gasket which are at the notching points are fitted over the several mandrels, with all of the mandrels entering the channel 5 of the gasket. The outer or exposed edge of each mandrel is formed with an outwardly extending nose portion 99, which is somewhat reduced in thickness and with inset beveled edge surfaces 100, as shown most clearly in Fig. 12. This peculiar configuration of the outer edge of the mandrel has been designed so that the nose portion 99 provides a surface against the lower side of which the tip 22 of die 21 will cut and the beveled surfaces permit the gasket to be pressed inwardly by the foot pieces, to be described, which grip and hold the gasket against the mandrels during the cutting operation.

Each block 90 is mounted for a limited vertical movement on a vertical post 105, the body of which is slidable in a vertical bore 104 formed in the base of the block. The lower end of the post 105 is reduced and set in one of the cross-plates 86. The lower end of the post is threaded and a clamping nut 106 holds the post in position on the cross plate. The post is provided with an axially located vertical passage 108 which opens from the lower end of the post and in which is received the coil compression spring 109, the lower end of which is held in the passage by the threaded stud 110. The upper end of the spring 109 bears against a flat surface cut in the central part of a transverse pin 112, which is driven into a horizontal bore through the lower part of the block 90.

It will be seen that the block 90 is urged upwardly by the expansion of the spring 109 against the pin 112 and the force of the spring is sufficient to hold the entire block against the lower face of the cross head 30, as shown in Fig. 6. The pin 112 also prevents rotation of the block 90 on the post 105. However, as the cross head is lowered, the block 90 moves downwardly on the post, compressing the spring until the block reaches the downward limit of its movement, as shown in Fig. 7. A bearing sleeve 114, which is force fitted into the bore 104, furnishes the sliding contact surface between the block 90 and the post 105.

The upper end of the post 105 is enlarged above the sleeve 114 and is machined to form a projection 115 shown in plan in Fig. 9, the edge portions of which fit the contour of the inside of die 21. Filler pieces 116 fit the outer contour of the die and the die is held by a ring 118, the outer diameter of which corresponds to the outer diameter of the top of the post 105. Set screws 119, threaded in the ring 118, hold the filler pieces 116 against the sides of the die so that the whole assembly is locked on the top of the post.

In the upper end of each block 90, above the mandrel and in alinement with the bore 104, is a second bore 120 having a bearing sleeve 121 in which is movable a post 122 similar in certain respects to the post 105. The post 122 is provided with an axial passage 124 in which is located the coiled compression spring 125 bearing, at its lower end, against the flat center portion of transverse pin 126 similar in function to the pin 112. A threaded stud 128 at the upper end of the bore confines the spring.

At this point it will be noted that the two bores 104 and 120 are extended in opposite directions toward the mandrel-holding portion of the block 90 to form the outwardly projecting ledge 92 and to allow for the inward movement of the die-holding members 105 and 122.

The upper exposed end of the post 122 is threaded and on this threaded surface is the adjustable collar 130 which forms the actual abutting surface which contacts the underside of the cross head 30. It will be seen that the force of the springs 109 and 125 keeps all of the notching units 85 elevated against the abutment formed by the cross head and that while the lower limit of movement of the cross head is determined by its contact with the posts 82, the effective stroke of the blocks 90 is determined by the vertical adjustment of the collars 130.

In the lower end of the post 122 is mounted the die 20 by an arrangement similar to that which holds the die 21 on the post 105. The lower end of post 122 is machined to provide a projection 132 which fits against the inside of die 20, filler pieces 133 fit against the outside surfaces of the die and a surrounding ring 134 and set screws 135 hold the assembly together on the end of the post 122, as shown in Fig. 11.

When the cross head 30 is elevated the block assembly will be in the condition shown in Fig. 6, with the dies spaced from the mandrel 93 and the springs 109 and 125 extended. As the cross head lowers to cut the gasket, the post 122 will move downwardly, forcing the die 20 into the web 1, and this will carry the block 90 downwardly, causing the mandrel 93 to be moved against the edge of the die 21 and the die 21 to cut the notch 16 in the hollow portion of the gasket. At the end of the cutting stroke, the block 90 and its various elements will assume the position shown in Fig. 7 with both springs compressed. On raising the cross head 30 the expansion of the springs will return the die block 90 and the parts thereof to the positions shown in Fig. 6. The mandrel will strip the gasket from both dies and the pieces cut out will normally be removed with the gasket.

In connection with the description of the gasket G, it will be recalled that the upper portion of the gasket 3 (which is beneath the mandrel 93 when the gasket is in position), is quite flexible and yielding, so much so that any pressure exerted against it by a cutting die, which would be sufficient to cut the gasket, will deform that portion of the gasket so that the resultant cut may assume all sorts of shapes. In order to meet this condition, the method of cutting which has been devised provides for the preliminary deformation of the gasket before cutting, which preliminary deformation is carried to the point where the impact of the cutting die will either create no further deformation or the subsequent deformation is so slight that the effects thereof upon the contour of the cut are either negligible or may be anticipated in designing the contour of the die.

In the machine and process shown herein, the procedure outlined above to offset the crushing effect of the die 21 on the hollow part 3 of the gasket, and to achieve like cuts of the desired contour at each cutting stroke of the die, is to provide a compression member or plate which will compress the flexible portion of the gasket just before the die 21 reaches the gasket and hold the gasket in flattened or "squashed" condition while the cutting stroke is completed. It is necessary to hold the gasket firmly on the mandrel during the compression and cutting, and this is done by the pressure feet to which reference has been made and which will be described later.

In the specific embodiment of the invention there is shown one form of compression device, but it will be understood that after the invention has been explained other types of compression members may be devised to perform the same general functions.

The compression member or "squasher" which is illustrated herein is shown in perspective in Fig. 6a. It consists of a plate 140 having wings or lugs 141 at the inside corners which span the block 90 where they are apertured to receive the pivot pins 142 driven into the block at a point just below the underside of the mandrel 93. The outer or forward portion 143 of the plate extends to about the front face of the block 90. The central portion of the plate is concaved on its upper surface, as at 144, the outline of which is shown in Figs. 6 and 7. This concavity conforms to the curvature which the part 3 of the gasket is to assume during the cutting of the notch 16. The center of the plate is cut out along the line 146 so as to clear the die 21 and also to allow space for the stock of the gasket. At the inner ends of the cut-out portion 146 are shoulders 147.

Set in the ring 118, opposite the tip of the die 21, is a pin 148. When the die members are withdrawn, the outer edge of the plate 140 will rest on the top of the pin 148. As the block 90 descends for the cutting stroke, the plate 140 will be rocked upwardly by contact of the tip of the pin 148 with the part 143 of the plate. This movement will compress and flatten the outer portion of the gasket just ahead of the contact of the die 21 with the gasket and will hold it in that compressed condition during the actual cutting of the gasket.

It will be noted that the "squashing" of the gasket will cause the outer edge of the gasket, at the cutting point, to move outwardly because the stock must find an escape. This condition is illustrated in Fig. 7. It is because of this behavior of the gasket that the tip 22 of the die 21 is not in register with, but outside of, the tip of the die 20. When the dies move to their outer positions, the tip 23 of the cut 16 will move inwardly due to the rounding out of the hollow portion of the gasket, but as explained in the description of the gasket the point 23, when the gasket is in repose, is actually set in a slight distance from the point or apex of the cut 15.

*The punching dies*

In the finished gasket, shown in Fig. 13, four slots 8 are cut in the web 1. This number of slots is arbitrary and may be increased or diminished.

As the punching operation is performed in the web 1 only and as that part of the gasket does not need to move up and down during the cutting operation, as is the case with the portion of the gasket having the V-notches, the operation may be done by a simple reciprocating punch.

In the machine as shown, the several punches are indicated at 150 and are shown more clearly in Fig. 3a. Each consists of a block 151 which is fixed to a plate 152 resting on the beams 58 and held in position by clamping blocks 153 and bolts 154 similar to those described in connection with the anvils 68. The front face of the block 151 is cut out, as at 155, to receive the gasket and in this recess is set a mandrel 156 which is received in the channel 5 of the gasket and has a punch opening 157. Above the mandrel 156 in the block 151 is a reciprocating punch 159 which is yieldingly held in its raised position by a spring 160, which is similar to the spring 125 in construction and operation. The punch extends upwardly beyond the block 151, where it is provided with a screw threaded collar 162 similar to the collar 130 and held by the spring 160 against the underside of the cross head 30.

The lowering of the cross head causes the holes 8 to be punched out of the web 1 at the same time that the V-shaped notches are cut at other points along the gasket.

*The pressure feet*

Frequent reference has been made to the fact that during the notching and punching operations the gasket is held firmly in position on the mandrel. This operation is performed by a plurality of pressure members equal to the number of notching and punching instrumentalities. These pressure members or feet are moved inwardly toward the cutting points and bear against the outer edge of the gasket at the vertical web 2, pressing and holding the gasket against the several mandrels 93 and 156 during the cutting. Because the mandrels 93 move up and down during the operation of the cutting devices, while the mandrels 156 are stationary, the pressure feet in alinement with the two types of cutting devices are not identical.

The pressure feet for the notching devices are indicated as a whole at 165 and those for the punches are indicated at 166. All of the pressure feet are mounted on the tops of posts 168 by bolts 169 which pass through slots at the outer ends of the feet so that they may be adjusted to the correct position to bear against the gasket with sufficient force to hold the gasket on the several mandrels. The pressure feet constitute grippers to hold the gasket against the edges of the several mandrels.

All of the posts 168 are mounted along the inner edge of the sliding table 50 so that their positions along the table may be adjusted to correspond to the adjusted positions of the cutters and punches 85 and 150. This is done by providing a T-slot 172 along the top of the table in which the heads of studs 174 are received, the studs being threaded in the bases of posts 168.

The table 50 is moved to and fro on the pins 51 and along the rails 54 by means of two racks 176 attached by bolts 177 to the underside of the table at the ends thereof. Each rack is in mesh with a gear 179 carried on a shaft 180 rotatable in a bearing 181 welded to the horizontal flange of the beam 53. The racks 176 are held against the gears 179 by rollers 183 rotatable in bearings 184 set in the beam 53. To the lower end of each shaft 180 is keyed a collar 186 from which projects a lever arm 188. The two levers 188 are parallel and to the ends thereof are pivoted clevises 189 which are connected for joint movement by a long shift bar 190 extending across the front of the machine below the table 50.

The shift bar is connected by an arm 192 to the outer end of a piston rod 193 connected to a piston in a cylinder 195 carried at a convenient point on the inside of beam 53. The piston in the cylinder is moved in opposite directions by air pressure controlled by a valve (not shown) which will admit air under pressure to either end of the cylinder. It will be seen that when the air pressure moves the piston to the right, the gears 179 will move the table inwardly until it is arrested by the contact of the inner ends of the pressure feet with the gasket at the several mandrels. When pressure in the cylinder is reversed, the table will be withdrawn to the position shown in full lines in Fig. 3.

Admission of fluid pressure to the operating cylinder for the table is under control of one of the operators who steps on a depending treadle or stirrup 198, the upper end of which is pivoted to a crank arm 199 carried on one end of horizontal shaft 200, which rocks in bearings 201 attached to the front of the machine. The shaft is connected to and operates the valve which controls the admission of pressure to cylinder 195 by any suitable connections, indicated at 204. The valve is held by the coil spring 202 in its normal position, in which air pressure holds the piston in the position shown in Fig. 2, with the table in its outer position. After the operators have placed the gasket in position on the several mandrels, one of the operators depresses the stirrup 198 and the table moves forward to grip the gasket. The operator holds the treadle down while the buttons 55 are pressed and the cutting operations are performed. The stirrup or treadle 198 is then released and the table retreats, removing the feet to their outer positions.

Referring to the pressure feet 165, each of these devices consists of a rigid bar 205, along the underside of which is located a flat spring metal plate 206 which is slotted at the outer end and fixed in place on the top of post 168 by the bolt 169. The forward end of plate 206 extends beyond bar 205 where it is fixed in a slot 207 on an elongated cross piece 208. The inner edge of the cross piece or head of the pressure foot is stepped back, as shown at 210 in Fig. 3, so as to leave a projecting upper edge 211 which engages the gasket and presses it against the bevel surfaces 100 on the mandrel 93. The central portion of the head is provided with a deep notch 212 which clears the nose 99 of the mandrel and the lower wall of this notch is cut out to clear the tip 22 of the die 21, as shown at 214.

The designing of the outer edge of the mandrel 93 and the opposing face of the head of the pressure foot has been worked out so as to take care of the deformation of the gasket and to hold the same in place. The working space at this point is very close and the parts are so devised that there will be no interference with the lower die.

As noted in connection with the operation of the notch cutters, the mandrel moves downwardly during the cutting strokes and the spring plate 206 allows the head 208 to move downwardly with the mandrel, as shown by a comparison of the locations of the head in Figs. 6 and 7, without relaxing the grip on the gasket. The upward movement of the compression plate 140 may squeeze some of the stock out through the space between the compression plate and the head of the pressure foot, in which event the pressure foot is moved upwardly slightly without releasing the hold on the gasket.

The pressure feet 166 for the punches require no such elaborate arrangement to grip the gasket and a simple bar such as indicated at 166 will do the work.

*Operation*

A brief résumé of the operations will suffice. The cross head 30 being raised and the table 50 being withdrawn, the two operators placed the unfinished gasket in position on the several mandrels. One of the operators steps on the treadle 198 and the table moves inwardly until the gasket is gripped between the several pressure feet and the mandrels. Both operators now press the four buttons 55 and the head descends. At the ends, the gasket is cut to correct length by the knives 76 and at the punching points the slots 8 are cut in the web 1 of the gasket by the punches 159. The downward movement of the notching units carries the several dies 20 into cutting relation with the gasket in the top surfaces of mandrels 93 and at the same time the compression plates 140 rise, partially flattening the hollow portion of the gasket and, while so held, the dies 21 make the V-notches of the peculiar configuration in portion 3 of the gasket. When the cuts have been made, release of the buttons 55 raises the cross head, the treadle 198 is relaxed, and the table 50 retracts, permitting the removal of the finished gasket.

It will be seen that the making of a machine to cut the correct V-shaped notches in a rubber gasket of this type is a precision task requiring very careful designing of the cutters, the mandrels, and the pressure feet. A very detailed description has been given of these devices as they represent the final workable design, but in its broader aspects the invention is not restricted to the details given. The machine has been made adjustable in all of its operating points so as to make it possible to change the locations and numbers of all of the cutters for different sizes of gaskets and for different locations of the several cutting points.

The design of the V-shaped notch in the part 3 of the gasket is essential to the perfectly sealed diagonal joint at the corners of the gasket.

However, except as specifically limited in the claims, the claims are intended to cover variations and modifications in the various elements thereof which do not depart from the broad aspects of the invention.

What is claimed is:

1. A machine for cutting out a portion of a gasket, said gasket having a compressible sealing portion, comprising a movable cutter block, a mandrel on the block to hold the gasket in position, a die at one side of the mandrel, means for moving the block to bring the mandrel in contact with the die, a compressor mounted on the block and shiftable by the movement of the block to engage and compress the sealing portion of the gasket before the die contacts the gasket and to hold it in compressed condition during the cutting operation, and a gripper to engage the gasket and hold it on the mandrel.

2. A machine for cutting out a portion of a gasket, said gasket having a compressible sealing portion, comprising a movable cutter block, a mandrel on the block to hold the gasket in position, a die at one side of the mandrel, means for moving the block to bring the mandrel in contact with the die, a compressor mounted on the block and shiftable by the movement of the block to engage and compress the sealing portion of the gasket before the die contacts the gasket and to hold it in compressed condition during the cutting operation, a gripper, and means to move the gripper toward the mandrel to engage the gasket and hold it on the mandrel, said gripper being shiftable with the mandrel.

3. In a machine for cutting registering notches in a gasket, said gasket comprising a web, a compressible sealing portion and an intermediate channel, said machine having a movable cutter block, a mandrel on the block insertable in the channel, a shiftable cutting die at one side of the mandrel, and a stationary second cutting die on the other side of the mandrel, and means for moving the first said die against the mandrel to cut one side of the gasket, and for moving the block to bring the other side of the mandrel against the stationary die.

4. In a machine for cutting registering notches in a gasket, said gasket comprising a web, a compressible sealing portion and an intermediate channel, said machine having a movable cutter block, a mandrel on the block insertable in the channel, a shiftable cutting die at one side of the mandrel, and a stationary second cutting die on the other side of the mandrel, and means for moving the first said die against the mandrel to cut one side of the gasket and for moving the block to bring the other side of the mandrel against the stationary die, and a gripper to press the gasket against the mandrel during the cutting operation.

5. In a machine for cutting registering notches in a gasket, said gasket comprising a web, a compressible sealing portion and an intermediate channel, said machine having a movable cutter block, a mandrel on the block insertable in the channel, a shiftable cutting die at one side of the mandrel, and a stationary second cutting die on the other side of the mandrel, means for moving the first said die against the mandrel to cut one side of the gasket and for moving the block to bring the other side of the mandrel against the stationary die, a gripper to press the gasket against the mandrel during the cutting operation, and a yielding mounting for said gripper movable with the movement of the mandrel.

6. In a machine for cutting registering notches in a gasket, said gasket comprising a web, a compressible sealing portion and an intermediate channel, said machine having a movable cutter block, a mandrel on the block insertable in the channel, a shiftable cutting die at one side of the mandrel and a stationary cutting die at the other side of the mandrel, said stationary die having two arms arranged in a V-outline, each of said arms having an ogee curvature at the cutting surface of the die, and means for moving the first said die against the mandrel to cut one side of the gasket and for moving the block to bring the other side of the mandrel against the stationary die.

7. In a machine for cutting registering notches in a gasket, said gasket comprising a web, a compressible sealing portion and an intermediate channel, said machine having a movable cutter block, a mandrel on the block insertable in the channel, a shiftable cutting die at one side of the mandrel and a stationary cutting die at the other side of the mandrel, means for moving the first said die against the mandrel to cut one side of the gasket and for moving the block to bring the other side of the mandrel against the stationary die, a compressor to compress the sealing portion of the gasket, and means to move the compressor into contact with the sealing portion before a die contacts that part of the gasket.

8. A machine in accordance with claim 7 in which the compressor is a plate pivoted on the block and having a recess to permit the passage of the die and an abutment on the stationary cutting die in the path of the plate to move the plate against the sealing portion of the gasket and hold it during the cutting operation.

9. In a machine for cutting registering notches in a gasket, said gasket comprising a web, a compressible sealing portion and an intermediate channel, said machine having a movable cutter block, a mandrel on the block insertable in the channel, a shiftable cutting die at one side of the mandrel and a stationary cutting die at the other side of the mandrel, means for moving the first said die against the mandrel to cut one side of the gasket and for moving the block to bring the other side of the mandrel against the stationary die, a gripper, means to move the gripper against the gasket on the mandrel, and a yielding mounting for the gripper to permit the gripper to move with the mandrel.

References Cited in the file of this patent

UNITED STATES PATENTS

| Number | Name | Date |
|---|---|---|
| 439,479 | Cox | Oct. 28, 1890 |
| 462,205 | Clark | Oct. 27, 1891 |
| 700,141 | Grall | May 13, 1902 |
| 1,360,048 | Stock | Nov. 23, 1920 |
| 1,695,073 | Wirfs | Dec. 11, 1928 |
| 1,806,266 | Sawle | May 18, 1931 |
| 1,906,875 | Wright | May 2, 1933 |
| 2,006,417 | Topping | July 2, 1935 |
| 2,057,928 | Stahl | Oct. 20, 1936 |
| 2,144,059 | Hershel et al. | Jan. 17, 1939 |
| 2,144,060 | Hershel et al. | Jan. 17, 1939 |
| 2,213,858 | Gundersen et al. | Sept. 3, 1940 |
| 2,263,831 | Welch | Nov. 25, 1941 |
| 2,348,529 | Doehm | May 9, 1944 |
| 2,570,919 | Clifford | Oct. 9, 1951 |